(12) United States Patent
Nakagawa

(10) Patent No.: US 6,204,692 B1
(45) Date of Patent: Mar. 20, 2001

(54) DRIVER CIRCUIT UNIT

(75) Inventor: Masashi Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/342,137

(22) Filed: Jun. 29, 1999

(30) Foreign Application Priority Data

Jun. 30, 1998 (JP) .................................................. 10-185392

(51) Int. Cl.[7] .................................................. H03K 19/094
(52) U.S. Cl. ....................................... 326/83; 365/230.06
(58) Field of Search .......................... 326/83; 365/230.06

(56) References Cited

U.S. PATENT DOCUMENTS 5,111,080 * 5/1992 Mizukami et al. .................. 307/475

* cited by examiner

Primary Examiner—David Nelms
Assistant Examiner—M. Tran
(74) Attorney, Agent, or Firm—Young & Thompson

(57) ABSTRACT

When a driver circuit unit issues data to a receiver through a transmission line, the unit performs a matching operation to the characteristic impedance of the transmission line so that the logic level of an input signal received by the receiver is properly controlled, the unit includes a first push-pull circuit for issuing an output signal to an output terminal through resistors when transmitted data is issued to an input terminal, the output signal having its logic level correspond to the transmitted data; a second push-pull circuit for issuing a negative-phase output signal to an output terminal through resistors when negative-phase data, which is one reversed in phase of the above transmitted data, is issued to an input terminal, the negative-phase output signal having its logic level correspond to the negative-phase data; and, a resistor connected between the first output terminal and the second output terminal.

28 Claims, 6 Drawing Sheets

DRIVER CIRCUIT UNIT

BACKGROUND OF THE INVENTION

1. Field of the Invention

The present invention relates to a driver circuit unit, and more particularly to a driver circuit unit for issuing data to a transmission line.

2. Description of the Related Art

A so-called driver circuit unit functions to issue transmitted data having been received therein to a receiver through a transmission line. Inputted to the above driver circuit unit as input signals are: positive-phase data which is the above mentioned transmitted data having been received in the driver circuit unit; and, negative-phase data which is one reversed in phase of the positive-phase data. Further, issued from the above driver circuit unit to the receiver are: an output signal corresponding to the above positive-phase data; and, an negative-phase output signal corresponding to the above one reversed in phase of the positive-phase data. More specifically, as shown in FIG. 4, inputted to a conventional driver circuit 101 are: positive-phase data 201 which is the above-mentioned transmitted data and a negative-phase data 202.

For example, as shown in FIG. 5, when the positive-phase data 201 is constructed of a series of signals with logic levels H and L, i.e., a series of signals with high level (H), high level (H), low level (L), high level (H), low level (L) and low level (L) sequentially arranged in a row in the above-mentioned order, the negative-phase data 202 is constructed of a series of the negative-phase ones of the signals with the above-mentioned logic levels. In other words, the negative-phase data 202 is constructed of a series of low level (L), low level (L), high level (H), low level (L), high level (H) and high level (H) sequentially arranged in a row in the above-mentioned order, as shown in FIG. 5.

In operation, as shown in FIG. 4, when the conventional driver circuit 101 receives the positive-phase data 201 together with the negative-phase data 202, a pair of switches 101A, 101B perform their switching operations in accordance with these two data 201, 202. In other words, in the driver circuit 101, when the positive-phase data 201 is in the high level, a resistor 101c is connected with a power supply line(+). In contrast with this, when the positive-phase data 201 is in the low level, the resistor 101C is connected to the ground. Further, in the driver circuit 101, when the negative-phase data 202 is in the low level, a resistor 101D is connected to the ground. In contrast with this, when the negative-phase data 202 is in the high level, the resistor 101D is connected with the power supply line.

As a result, when the above-mentioned transmitted data is in the high level, the resistor 101C has a voltage equal to that $V_{DD}$ of the power supply line, and the resistor 101D is held at the ground level in voltage. On the other hand, when the transmitted data is in the low level, the resistor 101C is connected to the ground, and the resistor 101D is held at the voltage VDD of the power supply line.

The resistors 101C and 101D of the driver circuit 101 are connected with coaxial cables forming transmission lines 102 and 103, respectively. At this time, in the driver circuit 101, the positive-phase data 201 and the negative-phase data 202 are transmitted from the driver circuit 101 to the transmission lines 102 and 103, respectively, provided that the resistors 101C, 101D are used to have the impedance of the driver circuit 101 matched to that of each of the transmission lines 102 and 103.

In a receiver 104 shown in FIG. 4, a signal produced between a pair of the transmission lines 102 and 103 is received in a series circuit of a pair of resistors 104A, 104B. A node N interposed between the resistors 104A, 104B is connected to the ground through a capacitor 104C. In operation, in the receiver 104, when the above-mentioned transmitted data is in the high level, an electric current flows in the direction of the arrow 104E through the series circuit of the resistors 104A, 104B. On the other hand, when the transmitted data is in the low level, the electric current flows in the direction of the arrow 104F through the above series circuit of the resistors 104A, 104B. As a result, an input signal 211 is produced at a node "P" located between the resistor 104A and the transmission line 102. On the other hand, another input signal 212 is produced at a node "Q" located between the resistor 104B and the transmission line 103. The thus produced input signals 211, 212 are inputted to a differential operation portion 104D.

In this differential operation portion 104D, the electric current flowing in the direction of the arrow 104E produces a high level signal which is issued from the differential operation portion 104D. Also in this differential operation portion 104D, the electric current flowing in the direction of the arrow 104F produces a low level signal which is also issued from the differential operation portion 104D.

This differential operation portion 104D is shown in FIG. 6. The differential operation portion 104D shown in FIG. 6 is constructed of a two-stage circuit which is provided with both a differential amplifier 110 and an inverter 120. As shown in FIG. 6, the differential amplifier 110 is constructed of: a plurality of P (i.e., Positive) type MOS (i.e., Metal Oxide Semiconductor) transistors 111, 112, 113; and, a pair of N (i.e., Negative) type MOS transistors 114, 115. On the other hand, the inverter 120 is constructed of a P type MOS transistor 121 and an N type MOS transistor 122.

Both the MOS transistors 112, 113 of the differential amplifier 110 operate upon receipt of a constant electric current supplied from the MOS transistor 111. Inputted to the MOS transistor 112 through an input terminal 131 is an input signal 211 generated at the node "P" shown in FIG. 4. On the other hand, inputted to the other MOS transistor 113 through an input terminal 132 is an input signal 212 generated at the node "Q" shown in FIG. 4.

In operation, when the input signal 211 inputted to the input terminal 131 is higher in level than the input signal inputted to the input terminal 132 (in other words, when the transmitted data mentioned above is in the high level), the MOS transistor 112 is turned OFF so as to be non-conductive, while the other MOS transistor 113 is turned ON so as to be conductive. Due to this, the constant electric current issued from the MOS transistor 111 is supplied, through the MOS transistor 113, to the MOS transistor 115 which serves as a resistor, so that a node "R", through which a drain of the MOS transistor 113 is connected with a drain of the MOS transistor 115, becomes the high level. When this node "R" becomes the high level, the MOS transistor 114 is turned ON so as to be conductive, so that a node "S" through which a drain of the MOS transistor 114 is connected with a drain of the MOS transistor 112 becomes the low level.

When the node "S" becomes the low level, the MOS transistor 121 is turned ON so as to be conductive, while the MOS transistor 122 is turned OFF so as to be non-conductive. As a result, an output terminal 133, which forms a node trough which a drain of the MOS transistor 121 is connected with a drain of the MOS transistor 122, becomes the high level.

In contrast with this, when the input signal 211 inputted to the input terminal 131 is lower in level than the other input signal 212 inputted to the input terminal 132 (in other words, when the transmitted data described in the above is in the low level), the MOS transistor 112 is turned ON so as to be conductive, while the other MOS transistor 113 is turned OFF so as to be non-conductive. Since the MOS transistor 112 is turned ON so as to be conductive while the other MOS transistor 113 is turned OFF so as to be non-conductive as described above, the node "R" becomes the low level so that the MOS transistor 114 is turned OFF so as to be non-conductive, whereby the other node "S" becomes the high level.

When the node "S" becomes the high level, the MOS transistor 121 is turned OFF so as to be non-conductive and the other MOS transistor 122 is turned ON so as to be conductive. As a result, the output terminal 133 becomes the low level.

As described above, the differential operation portion 104D reproduces the above-described transmitted data of the driver circuit 101 to issue it therefrom. Problems to be solved by the present invention are inherent in the related art as follows: namely, the input signals 211 and 212, both of which are inputted to the differential operation portion 104D of the receiver 104 shown in FIG. 4, are voltages developed at the nodes p and Q, respectively. Consequently, when the logic levels representing the high and the low level of these input signals 211, 212 vary, the following problems occur.

For example, when the logic levels of the input signals 211, 212 are low, a voltage developed across the gate-source of each of the MOS transistors 112, 113 shown in FIG. 6 becomes large, which makes it possible for each of the MOS transistors 112, 113 to operate in a linear region. Consequently, in contrast with the ON and OFF operations in its saturation region, each of MOS transistors 112, 113 produces at a node "S" a signal with a level corresponding to the logic level of the input signal 211. In other words, produced at the node "S" in the above is a signal with a level intermediate between the high and the low signal levels produced in ordinary ON/OFF operations. Due to this, a malfunction often occurs in the inverter 120 in its inversion operation, which makes it substantially impossible for the receiver 104 to issue a signal corresponding to the above-mentioned transmitted data of the driver circuit 101.

On the other hand, when the logic level of the input signal 211 is high, the source voltage of each of the MOS transistors 112, 113 becomes high. As a result, a voltage developed across the drain-source of the MOS transistor 111 shown in FIG. 6 becomes small, which makes it possible for the MOS transistor 111 to operate in a linear region. Consequently, an electric current passing through the MOS transistor 111 is reduced. Due to this, for example, the MOS transistor 113 is turned ON so as to be conductive, which causes the MOS transistor 114 to malfunction in its ON/OFF operations since a voltage developed at the node "R" is reduced due to reduction in current supplied from the MOS transistor 111, even though such voltage at the node "R" should be kept at a high level.

SUMMARY OF THE INVENTION

In view of the above, it is an object of the present invention to provide a driver circuit unit, which is capable of properly controlling in logic level an input signal received by a receiver in a condition in which the diver circuit unit performs a matching operation in impedance with respect to the characteristic impedance of a transmission line through which a piece of transmitted data is transmitted to the receiver.

According to a first aspect of the present invention, there is provided a driver circuit unit having a first output terminal and a second output terminal connected with a receiver through a first and a second transmission line, respectively, the driver circuit unit comprising:

a first circuit for issuing an output signal to the first output terminal through a first resistor and a second resistor when transmitted data is issued to a first input terminal, the output signal having its logic level correspond to the transmitted data;

a second circuit for issuing an negative-phase output signal to the second output terminal through a third resistor and a second resistor when negative-phase data, which is one reversed in phase of the transmitted data, is issued to a second input terminal, the negative-phase output signal having its logic level correspond to the negative-phase data; and an adjusting resistor connected between the first output terminal and the second output terminal.

In the foregoing, a preferable mode is one wherein the first circuit comprises:

a first switching element connected between a power supply line and the first output terminal, the first switching element being turned ON and OFF according to the transmitted data;

the first resistor interposed between the first switching element and the first output terminal;

a second switching element connected between the first output terminal and the ground, the second switching element being turned ON and OFF according to the transmitted data when the first switching element is turned OFF and ON, respectively; and the second resistor interposed between the second switching element and the first output terminal.

Also, preferably, each of the first and the second switching elements is constructed of an insulated-gate type field effect transistor.

Preferably, the first and the second switching elements both of which are in conductive state are smaller in resistance value than the first resistor and the second resistor, respectively.

Also, a preferable mode is one wherein the second circuit comprises:

a third switching element connected between a power supply line and the second output terminal, the third switching element being turned ON and OFF according to the transmitted data;

a third resistor interposed between the third switching element and the second output terminal;

a fourth switching element connected between the second output terminal and the ground, the fourth switching element being turned ON and OFF according to the transmitted data when the third switching element is turned OFF and ON, respectively; and a second resistor interposed between the fourth switching element and the second output terminal.

Also, preferably, each of the third and the fourth switching elements is constructed of an insulated-gate type field effect transistor.

Also preferably, the third and the fourth switching elements both of which are in conductive state are smaller in resistance value than the third and the second resistors, respectively.

Further, preferably, each of the first, second, third and the second resistors is constructed of a metallic resistor.

Still further, a preferable mode is one wherein each of the first, second, third and the second resistors is made of high-melting point metal silicides.

In the above construction, the first circuit has the above output signal issued to the first output terminal through the first and the second resistors. On the other hand, the second circuit has the above negative-phase output signal issued to the second output terminal through the third and the fourth resistors. Further, the adjusting resistor is connected between the first and the second output terminals.

With the above construction, it is possible to perform a matching operation of its output impedance to the first transmission line by using the first and the fourth resistors of the first circuit (or the third and the second resistors of the second circuit) together with the adjusting resistor, and also possible to perform a matching operation of its output impedance to the second transmission line by using the third and the second resistors of the second circuit (or the first and the fourth resistors of the first circuit) together with the adjusting resistor.

BRIEF DESCRIPTION OF THE DRAWINGS

The above and further objects, advantages and features of the present invention will be more apparent from the following description taken in conjunction with the accompanying drawings in which.

DETAILED DESCRIPTION OF THE PREFERRED EMBODIMENTS

A preferred mode for carrying out the present invention will be described in detail using a plurality of embodiments of the present invention with reference to the accompanying drawings.

Figure 1:
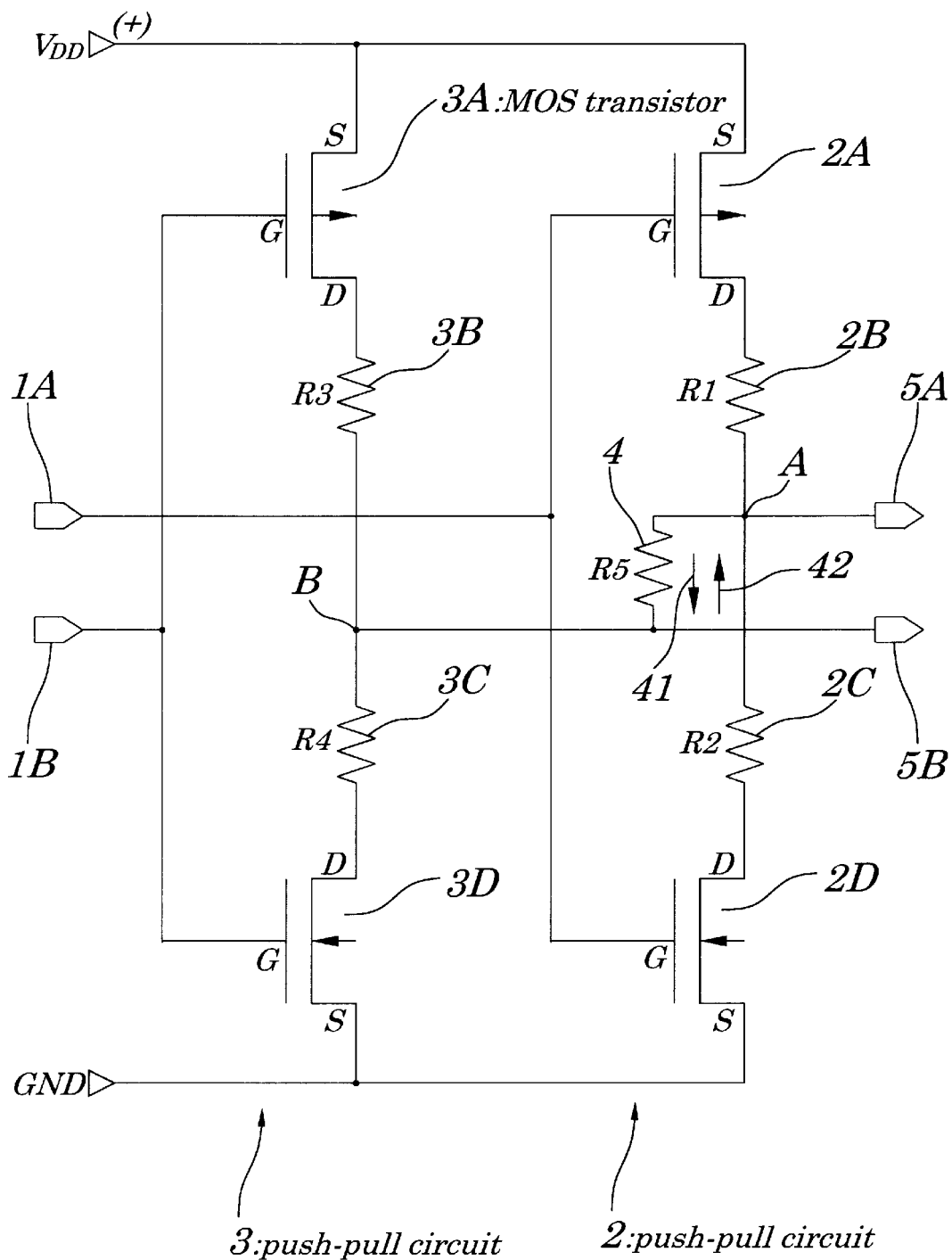
FIG. 1 is a circuit diagram of an embodiment of the driver circuit unit of the present invention.
Figure 2:
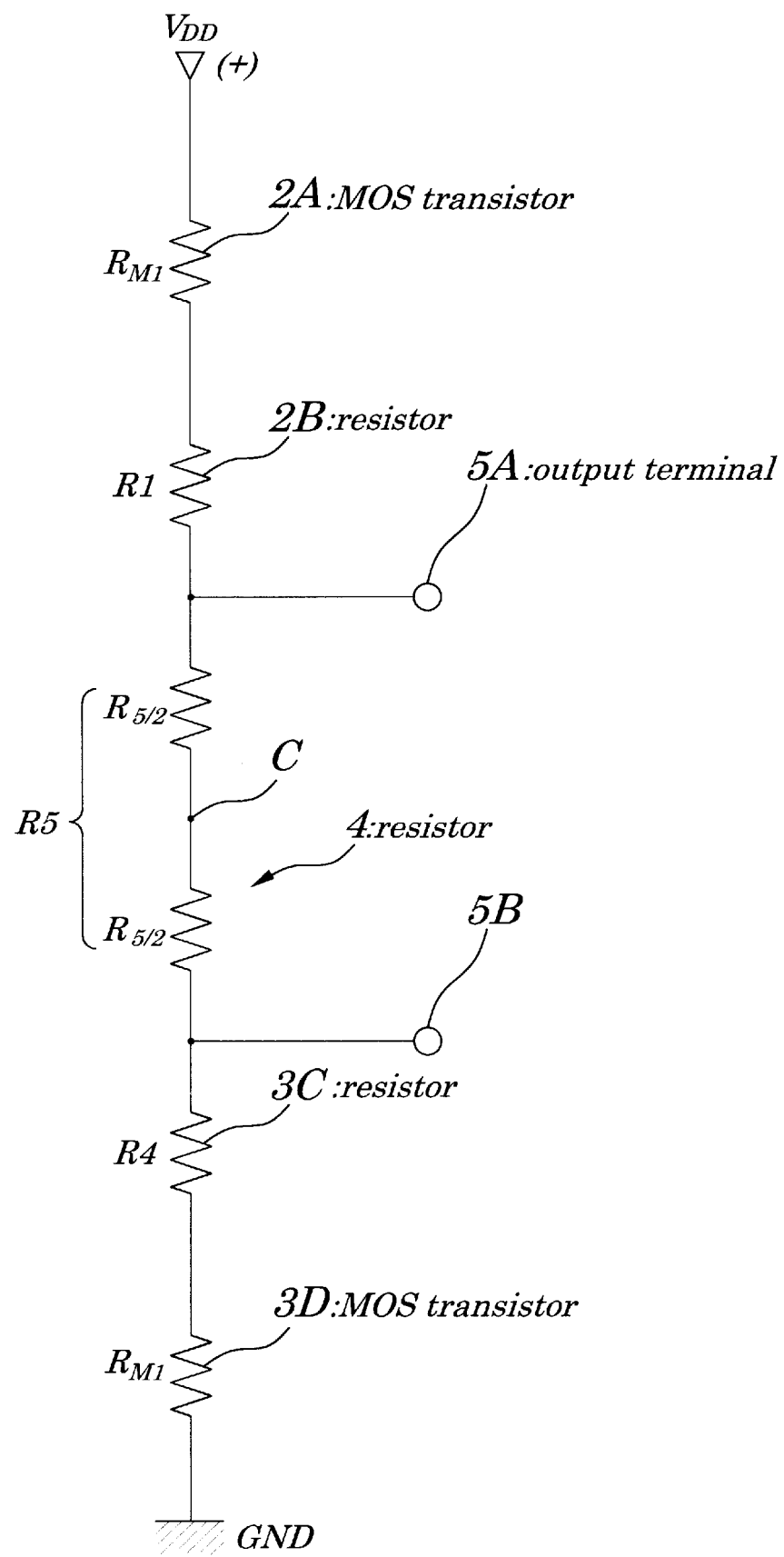
FIG. 2 is a circuit diagram of a circuit equivalent to the driver circuit unit of the present invention shown in FIG. 1.
Figure 3:
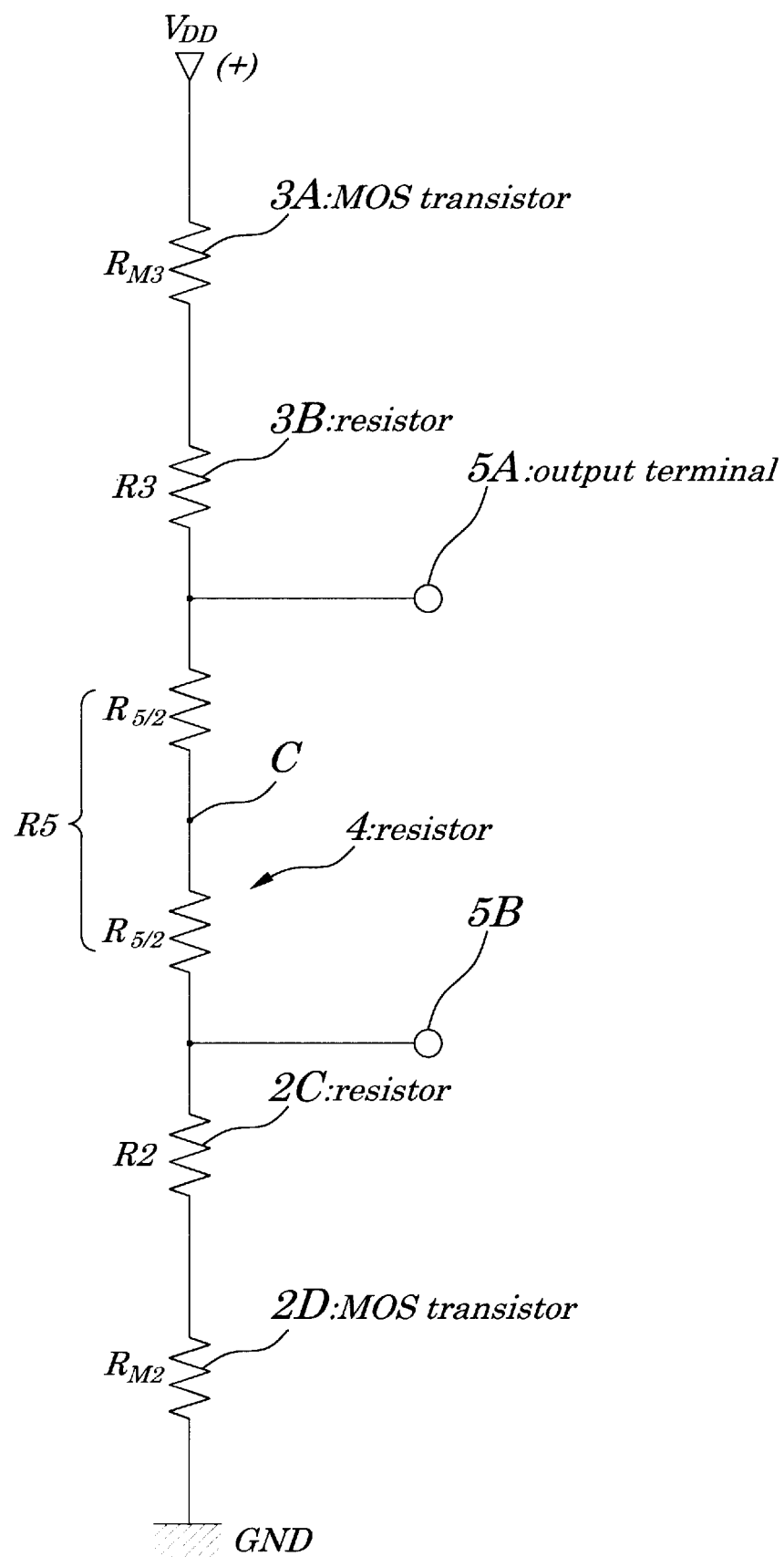
FIG. 3 is a circuit diagram of another circuit equivalent to the driver circuit unit of the present invention shown in FIG. 1.

FIG. 1 shows a circuit diagram of an embodiment of a driver circuit unit of the present invention. Shown in FIG. 2 is a circuit diagram of a circuit equivalent to the driver circuit unit of the present invention shown in FIG. 1. FIG. 3 shows a circuit diagram of another circuit equivalent to the driver circuit unit of the present invention shown in FIG. 1.

Figure 4:
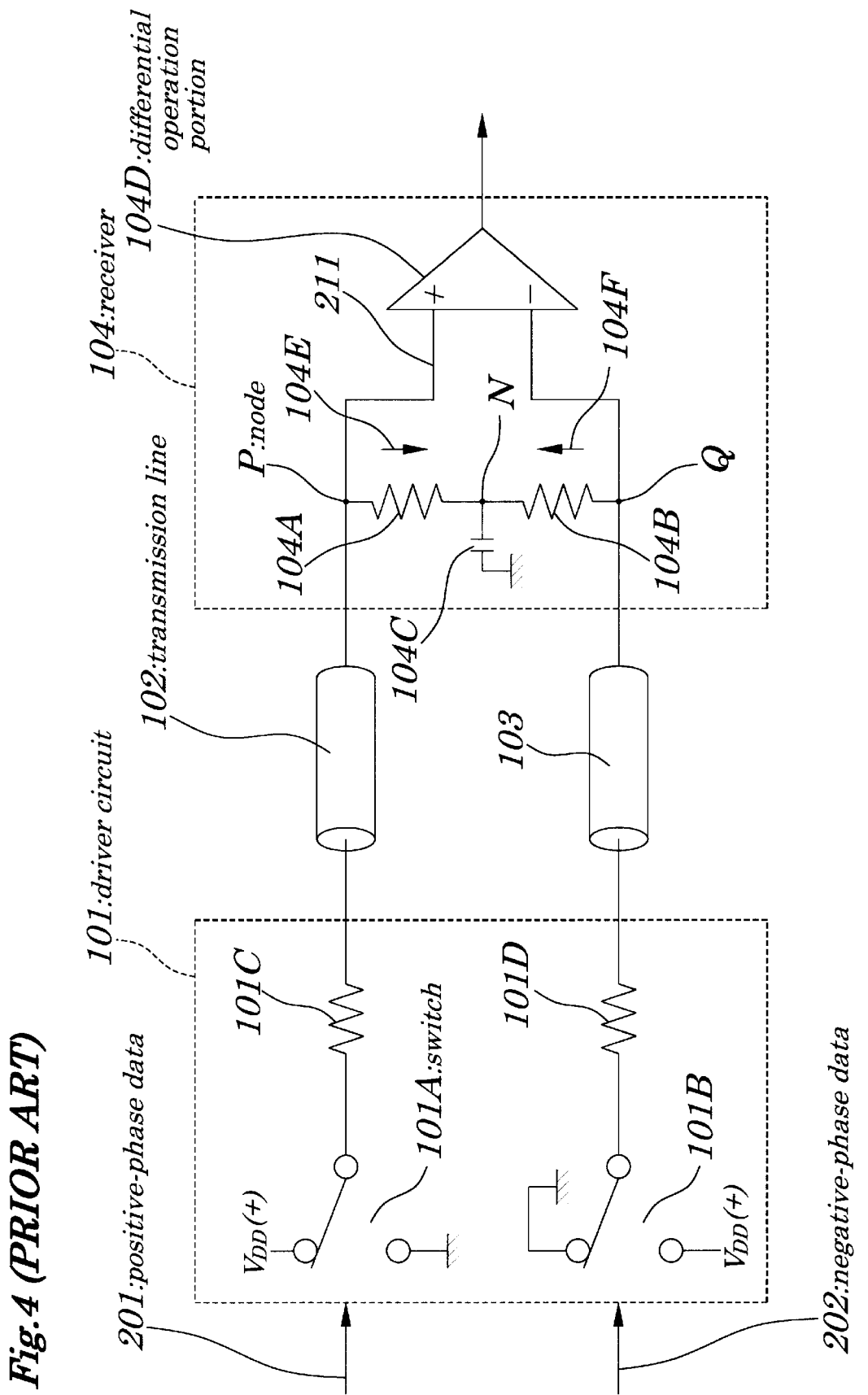
FIG. 4 is a circuit diagram of one of the conventional driver circuits.
Figure 5:
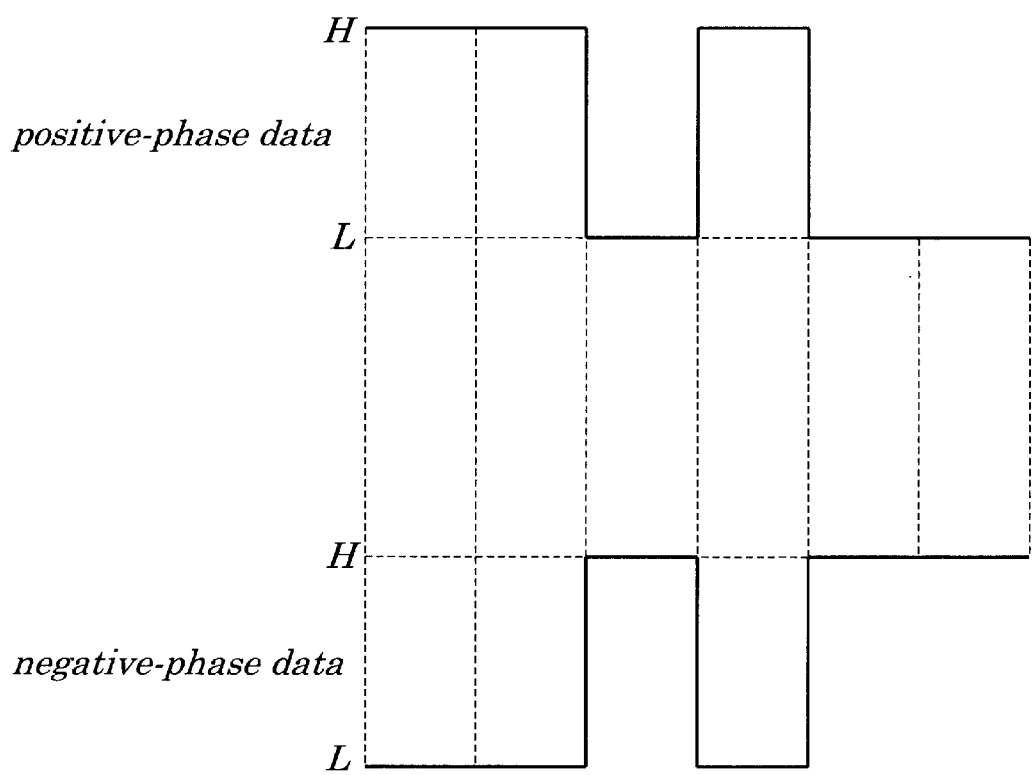
FIG. 5 is a schematic diagram of waveforms of the transmitted signals inputted to the conventional driver circuit unit shown in FIG. 4.
Figure 6:
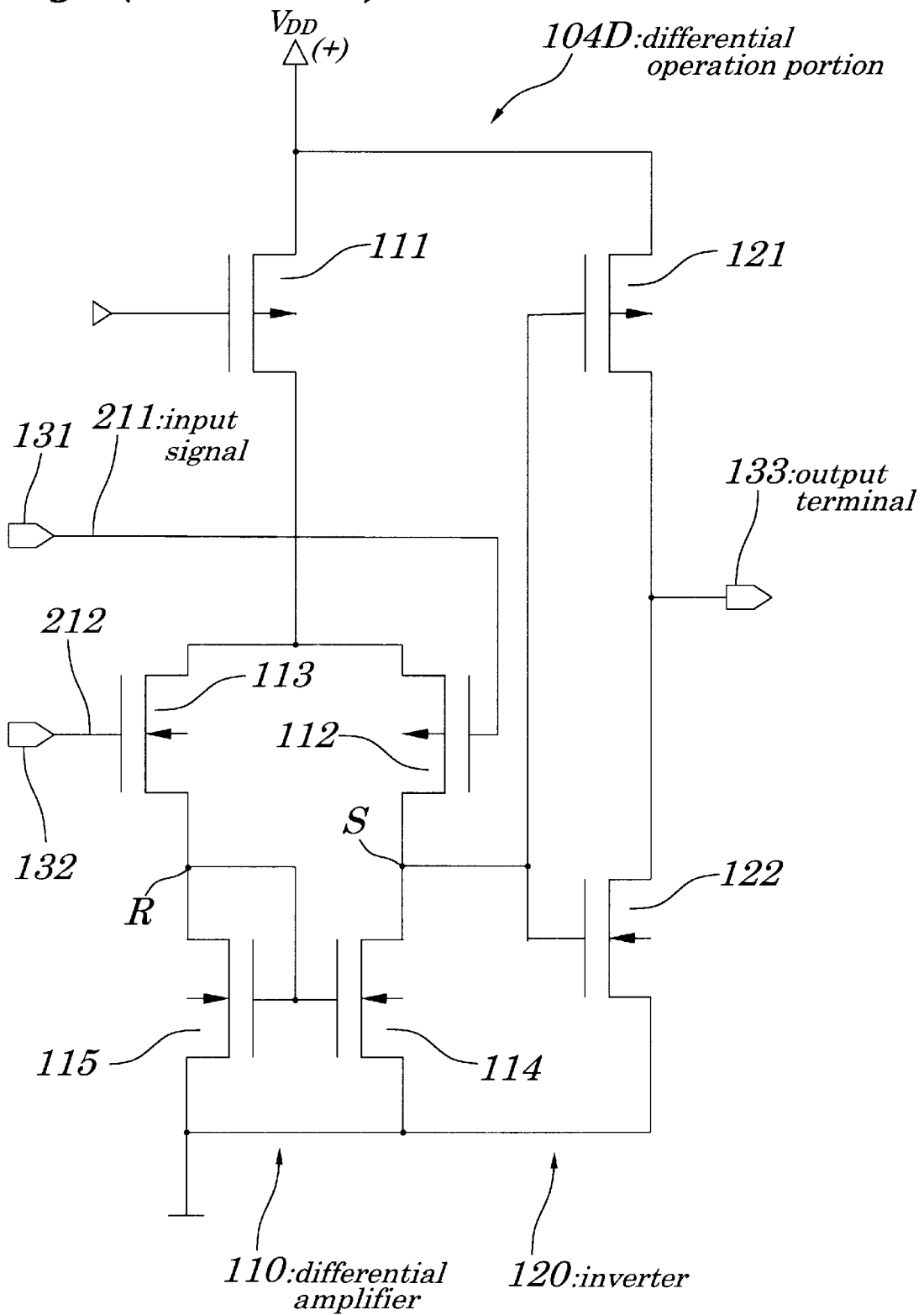
FIG. 6 is a circuit diagram of the conventional differential operation portion connected with the conventional driver circuit shown in FIG. 4.

The driver circuit unit of the present invention shown in FIG. 1 is used in place of the conventional driver circuit 101 shown in FIG. 4.

As shown in FIG. 1, the driver circuit unit of the present invention is provided with: a first input terminal 1A and a second input terminal 1B; a first push-pull circuit 2 and a second push-pull circuit 3; an adjusting resistor 4; and, a first output terminal 5A and a second output terminal 5B.

In the driver unit of the present invention shown in FIG. 1: inputted to the first input terminal 1A is positive-phase data 201 (shown in FIG. 4); and, inputted to the second input terminal 1B is negative-phase data 202 (shown in FIG. 4).

As is clear from FIG. 1, the first push-pull circuit 2 is provided with: a first switching element, i.e., first MOS transistor 2A; a second switching element, i.e., second MOS transistor 2D; a first resistor 2B with a resistance value R1; and, a second resistor 2C with a resistance value R2.

The first MOS transistor 2A is constructed of a p-type enhancement-type MOS FET (i.e., field effect transistor). The MOS transistor 2A has its source (S) connected with the power supply line and has its drain (D) connected with the first resistor 2B. The gate (G) of this first MOS transistor 2A is connected with the first input terminal 1A. On the other hand, the second MOS transistor 2D is constructed of an n-type enhancement-type MOS FET. The second MOS transistor 2D has its source (S) connected with the ground (GND), and has its drain (D) connected with the second resistor 2C. The gate (G) of this second MOS transistor 2D is connected with the first input terminal 1A.

The first resistor 2B has one of its opposite ends connected with the drain (D) of the first MOS transistor 2A, and the other of its opposite ends connected with one of opposite ends of the second resistor 2C. The other end of this second resistor 2C is connected with the drain (D) of the second MOS transistor 2D. The first resistor 2B is connected with the second resistor 2C through the node "A". Incidentally, as described above, in the drawings, the resistance value of the first resistor 2B is represented by the reference capital letter/numeral R1. On the other hand, the resistance value of the second resistor 2C is represented by the reference capital letter/numeral R2.

As for the second push-pull circuit 3, as shown in FIG. 1, it is provided with: the third MOS transistor 3A; the fourth MOS transistor 3D; the third resistor 3B; and, the fourth resistor 3C.

The third MOS transistor 3A is constructed of a p-type enhancement-type MOS FET (i.e., field effect transistor). This third MOS transistor 3A has its source (S) connected with the power supply line, has its drain (D) connected with the third resistor 3B, and has its gate (G) connected with the second input terminal 1B. On the other hand, the fourth MOS transistor 3D is constructed of an n-type enhancement-type MOS FET. This fourth MOS transistor 3D has its source (S) connected with the ground, has its drain (D) connected with the fourth resistor 3C, and has its gate (G) connected with the second input terminal 1B.

The third resistor 3B has one of its opposite ends connected with the drain (D) of the third MOS transistor 3A, and has the other of its opposite ends connected with one of opposite ends of the fourth resistor 3C. The other end of the opposite ends of the fourth resistor 3C is connected with the drain (D) of the fourth MOS transistor 3D. The third resistor 3B is connected with the fourth resistor 3C through the node "B". A resistance value of the third resistor 3B is represented by the reference capital letter/numeral "R3". Further, a resistance value of the fourth resistor 3C is represented by the reference capital letter/numeral "R4".

On the other hand, the adjusting resistor 4 has one of its opposite ends connected with the node "A", and has the other of its opposite ends connected with the node "B". A resistance value of the adjusting resistor 4 is represented by a reference capital letter/numeral "R5". The first output terminal 5A is connected with the node "A", while the second output terminal 5B is connected with the node "B".

In the driver circuit unit of the present invention having the above construction, so-called on resistance values $R_{M1}$, $R_{M2}$, $R_{M3}$ and $R_{M4}$, which correspond to the MOS transistors 2A, 2D, 3A and 3D being in conductive state, respectively, are designed to be small. Further, In the driver circuit unit of the present invention having the above construction, the following equations (1), (2), (3) and (4) must be satisfied with respect to the resistors 2B, 2C, 3B and 3C, respectively: namely, $$R_{M1} \ll R1 \quad (1)$$

$$R_{M2} \ll R2 \quad (2)$$

$$R_{M3} \ll R3 \quad (3)$$

$$R_{M4} \ll R4 \quad (4)$$

Further, in the driver circuit unit of the present invention having the above construction, the MOS transistors 2A, 2D, 3A, 3D and the resistors 2B, 2C, 3B, 3C, 4 are formed on an integrated circuit chip.

Now, in operation, this embodiment of the driver circuit unit of the present invention will be described.

In the first push-pull circuit 2 shown in the right half portion of FIG. 1, when the positive-phase data 201 is supplied to the first input terminal 1A and the negative-phase data 202 with a high level is supplied to the second input terminal 1B, the first MOS transistor 2A is turned ON so as to be conductive while the second MOS transistor 2D is turned OFF so as to be non-conductive. At this time, in the second push-pull circuit 3 shown in the left half portion of FIG. 1, the third MOS transistor 3A is turned OFF so as to be non-conductive. On the other hand, the fourth MOS transistor 3D is turned ON so as to be conductive. As a result, an electric current flows in the direction of the arrow 41 through the adjusting resistor 4, i.e., flows downward as viewed in FIG. 1, which causes a voltage appearing at the node "A" to be higher than a voltage appearing at the node "B". Consequently, due to the presence of the first MOS transistor 2A and the fourth MOS transistor 3D, it is possible to form a circuit (shown in FIG. 2) equivalent to the driver circuit unit of the present invention shown in FIG. 1. In this circuit shown in FIG. 2, the first MOS transistor 2A, first resistor 2B, adjusting resistor 4, fourth resistor 3C and the fourth MOS transistor 3D are connected with each other in series.

Further, in the driver circuit unit of the present invention shown in FIG. 1, when the positive-phase data 201 with the high level is supplied to the first input terminal 1A and the negative-phase data 202 with the low level is supplied to the second input terminal 1B, the first push-pull circuit 2 has its first MOS transistor 2A turned OFF so as to be non-conductive and also has its second MOS transistor 2D turned OFF so as to be conductive. At this time, in the second push-pull circuit 3, the second MOS transistor 3A is turned ON so as to be conductive and the fourth MOS transistor 3D is turned OFF so as to be non-conductive. As a result, the electric current flows upward in the direction of the arrow 42 as shown in FIG. 1, which causes a voltage appearing at the node "B" to be higher than a voltage appearing at the node "A". Due to the presence of the second MOS transistor 2D and the third MOS transistor 3A both in conductive states, it is possible to form a circuit (shown in FIG. 3) equivalent to the driver circuit unit of the present invention shown in FIG. 1. In this circuit shown in FIG. 3, the third MOS transistor 3A, third resistor 3B, adjusting resistor 4, second resistor 2C and the second MOS transistor 2D are connected with each other in series.

Here, in a condition in which the same transmission lines as those 102, 103 shown in FIG. 4 are used, each of the first resistor 2B, second resistor 2C, third resistor 3B and the fourth resistor 3C is selected so as to satisfy the following equation (5): namely, $$R1 = R2 = R3 = R4 = R \quad (5)$$

Under such circumstances, when a voltage of the power supply line is represented by the reference characters $V_{DD}$, a voltage appearing at a node "C" (shown in FIGS. 2 and 3) at which the adjusting resistor 4 is divided into two halves is equal to a value of $V_{DD}/2$. Consequently, it is possible to fix a voltage appearing at the node "C". As a result, in the circuit shown in FIG. 2, an output impedance "Z1" of the first output terminal 5A is given by the following equation (6): namely, $$Z1 = \{(R_{M1}+R1)\cdot(R5/2)\}/\{(R_{M1}+R1)+(R5/2)\} \quad (6)$$

On the other hand, as described above, in view of the above equation (1), the output impedance "Z1" of the first output terminal 5A is given by the following equation (7): namely, $$Z1 = \{R\cdot(R5/2)\}/\{R+(R5/2)\} \quad (7)$$

Similarly, in the circuit shown in FIG. 2, the output impedance "Z2" of the second output terminal 5B is given by the following equation (8): namely, $$Z2 = \{(R_{M4}+R4)\cdot(R5/2)\}/\{(R_{M4}+R4)+(R5/2)\} \quad (8)$$

Further, in view of the above equation (4), the output impedance "Z2" of the second output terminal 5B is given by the following equation (9): namely, $$Z2 = Z1 \quad (9)$$

Further, in the circuit shown in FIG. 2, since the equation (1) relates to the equation (4), it is possible to determine the logic level of each of the first output terminal 5A and the second output terminal 5B on the basis of the resistance values R1, R4 and R5, which values correspond to the resistors 2B, 3C and 4, respectively.

In the circuit shown in FIG. 3, the output impedance Z3 of the first output terminal 5A is given by the following equation (10):

$$Z3 = \{(R_{M3}+R3)\cdot(R5/2)\}/\{(R_{M3}+R3)+(R5/2)\} \quad (10)$$

Further, in view of the above equation (3), it is possible to represent the output impedance "Z3" of the first output terminal 5A by the following equation (11): namely, $$Z3 = Z2 = Z1 \quad (11)$$

Similarly, in the circuit shown in FIG. 3, the output impedance "Z4" of the second output terminal 5B is given by the following equation (12):

$$Z4 = \{(R_{M2}+R2)\cdot(R5/2)\}/\{(R_{M2}+R2)+(R5/2)\} \quad (12)$$

Further, since both the above equations (2) and (3) relate to the circuit shown in FIG. 3, it is possible to determine the logic level of each of the first output terminal 5A and the second output terminal 5B on the basis of the resistance values R3, R2 and R5, which values correspond to the resistors 3B, 2C and 4, respectively.

As described above, in the embodiments of the present invention, it is possible to determine the output impedances Z1, Z2, Z3, Z4 of both the first output terminal 5A and the second output terminal 5B together with their logic levels on the basis of the resistance values R1, R2, R3, R4, R5 of the resistors 2B, 2C, 3B, 3C, 4. In other words, it is possible to arbitrarily determine the output impedances Z1, Z2, Z3, Z4 together with their logic levels on the basis of these resistance values R1, R2, R3, R4, R5 of the resistors 2B, 2C, 3B, 3C, 4.

At the same time, these resistance values R1, R2, R3 and R4 are approximately ten times as large as the resistance values $R_{M1}$, $R_{M2}$, $R_{M3}$ and $R_{M4}$ of the MOS transistors 2A, 2D, 3A and 3D, respectively, provided that all of these MOS transistors 2A, 2D, 3A and 3D are in conductive state. In addition, these resistance values R1, R2, R3 and R4 satisfy the above equations (1), (2), (3) and (4). Consequently, under the above conditions, and with the condition that: in the process for fabricating the integrated circuit, with respect to variations in each of the resistance values $R_{M1}$, $R_{M2}$, $R_{M3}$ and $R_{M4}$ which correspond to the MOS transistors 2A, 2D, 3A and 3D all in conductive state, respectively, variations of each of the resistance values R1, R2, R3 and R4, which correspond to the resistors 2B, 2C, 3B and 3C, respectively, are sufficiently reduced, it is possible to make the driver circuit unit of the present invention: less susceptible to variations in power supply; and, less process-dependent in its properties, with respect to the above output impedances and the above logic levels.

Further, when metallic resistors made of high-melting point metal silicides, which are compounds formed by the reaction of metals or high-melting point metals and silicon, for example such as tungsten silicide, cobalt silicide, titanium silicide, molybdenum silicide and like silicides, are used as the above resistors 2B, 2C, 3B, 3C and 4, each of these resistors 2B, 2C, 3B, 3C and 4 all made of high-melting point metal silicides becomes temperature-independent in its properties. Consequently, it is possible to prevent the output impedances and the logic levels from varying even when these resistors 2B, 2C, 3B, 3C and 4 vary in temperature. Further, since the high-melting point metal silicides are larger in specific resistance than metal itself, it is possible to reduce each of the resistors 2B, 2C, 3B, 3C and 4 in its occupation area size on the chip in comparison with the resistors made of metal. Due to this, it is considerably advantageous to use the resistors made of such high-melting point metal silicides in place of the resistors made of metal.

Further, in operation, when the first MOS transistor 2A and the fourth MOS transistor 3D are in their conductive states, the resistors 2B, 4 and 3C are interposed between the first MOS transistor 2A and the fourth MOS transistor 3D. On the other hand, when the second MOS transistor 3A and the second MOS transistor 2D are in their conductive states, the resistors 3B, 4 and 2C are interposed between the second MOS transistor 3A and the second MOS transistor 2D. As a result, it is possible to reduce the amount of electric current passing through each of the above MOS transistors 2A, 2D, 3A and 3D.

Although the embodiments of the present invention have been described in detail with reference to the drawings in the above, the concrete construction of the driver circuit unit of the present invention is not limited to these embodiments only. In other words, various modifications and changes in design of these embodiments of the present invention may be made without departing from the spirit of the present invention, and, therefore contained in the scope of the present invention.

For example, though the MOS transistors 3A, 3B, 3C and 3D of the driver circuit unit of the present invention are of enhancement type, it is also possible to construct the push-pull circuits 2, 3 by means of MOS transistors of depletion type.

Further, in the above embodiments of the present invention, though the driver circuit unit of the present invention is formed on the integrated circuit chip, it is also possible to form the driver circuit unit of the present invention by mounting resistors and switching elements on a printed board.

As described above, it is possible for the driver circuit unit of the present invention having the above construction to determine its output impedance so as to match to the first transmission line by means of the resistors of the first circuit and the adjusting resistor, and also to determine its output impedance so as to match to the second transmission line by means of the resistors of the second circuit and the above adjusting resistor.

Further, in the driver circuit unit of the present invention having the above construction, since its output impedance matching to the first transmission line is determined by means of the resistors of the first circuit and the adjusting resistor, and since its output impedance matching to the second transmission line is determined by means of the resistors of the second circuit and the above adjusting resistor, it is possible to make the driver circuit unit of the present invention: less susceptible to variations in power supply; and, also less process-dependent in its properties.

It is thus apparent that the present invention should by no means be limited to the illustrated embodiments and various modifications and changes may be suggested without departing from the scope and spirit of the invention.

Finally, the present application claims the priority of Japanese Patent Application No.Hei 10-185392 filed on Jun. 30, 1998, which is herein incorporated by reference.

What is claimed is:

1. A driver circuit unit having a first output terminal and a second output terminal connected with a receiver through a first and a second transmission line, respectively, said driver circuit unit comprising:

a first circuit for issuing an output signal to said first output terminal through a first resistor and a second resistor when transmitted data is issued to a first input terminal, said output signal having its logic level correspond to said transmitted data;

a second circuit for issuing an negative-phase output signal to said second output terminal through a third resistor and a fourth resistor when negative-phase data, which is one reversed in phase of said transmitted data, is issued to a second input terminal, said negative-phase output signal having its logic level correspond to said negative-phase data; and an adjusting resistor connected between said first output terminal and said second output terminal.

2. The driver circuit unit according to claim 1, wherein said first circuit comprises:

a first switching element connected between a power supply line and said first output terminal, said first switching element being turned ON and OFF according to said transmitted data;

said first resistor interposed between said first switching element and said first output terminal;

a second switching element connected between said first output terminal and the ground, said second switching element being turned ON and OFF according to said transmitted data when said first switching element is turned OFF and ON, respectively; and said second resistor interposed between said second switching element and said first output terminal.

3. The driver circuit unit according to claim 2, wherein each of said first switching element and said second switching element is constructed of an insulated-gate type field effect transistor.

4. The driver circuit unit according to claim 3, wherein said second circuit comprises:
a third switching element connected between a power supply line and said second output terminal, said third switching element being turned ON and OFF according to said transmitted data;
a third resistor interposed between said third switching element and said second output terminal;
a fourth switching element connected between said second output terminal and the ground, said fourth switching element being turned ON and OFF according to said transmitted data when said third switching element is turned OFF and ON, respectively; and
a fourth resistor interposed between said fourth switching element and said second output terminal.

5. The driver circuit unit according to claim 4, wherein each of said third switching element and said fourth switching element is constructed of an insulated-gate type field effect transistor.

6. The driver circuit unit according to claim 5, wherein said third switching element and said fourth switching element both of which are in conductive state are smaller in resistance value than said third resistor and said fourth resistor, respectively.

7. The driver circuit unit according to claim 3, wherein each of said is third switching element and said fourth switching element constructed of an insulated-gate type field effect transistor.

8. The driver circuit unit according to claim 7, wherein said third switching element and said fourth switching element both of which are in conductive state are smaller in resistance value than said third resistor and said fourth resistor, respectively.

9. The driver circuit unit according to claim 2, wherein each of said third switching element and said fourth switching element is constructed of an insulated-gate type field effect transistor.

10. The driver circuit unit according to claim 9, wherein said first switching element and said second switching element both of which are in conductive state are smaller in resistance value than said first resistor and said second resistor, respectively.

11. A driver circuit unit having a first and a second output terminal both connected with a receiver through a first and a second transmission line, respectively, said driver circuit unit comprising:
a first circuit for issuing an output signal to said first output terminal through a first resistor and a second resistor when transmitted data is issued to a first input terminal, said output signal having its logic level correspond to said transmitted data;
a second circuit for issuing a negative-phase output signal to said second output terminal through a third resistor when negative-phase data, which is one reversed in phase of said transmitted data, is issued to a second input terminal, said negative-phase output signal having its logic level correspond to said negative-phase data; and
an adjusting resistor connected between said first and said second output terminals wherein said first circuit comprises:
a first switching element connected between a power supply line and said first output terminal, said first switching element being turned ON and OFF according to said transmitted data;
said first resistor interposed between said first switching element and said first output terminal;
a second switching element connected between said first output terminal and the ground, said second switching element being turned ON and OFF according to said transmitted data when said first switching element is turned OFF and ON, respectively; and
said second resistor interposed between said second switching element and said first output terminal.

12. The driver circuit unit according to claim 11, wherein said first switching element and said second switching element both of which are in conductive state are smaller in resistance value than said first resistor and said second resistor, respectively.

13. The driver circuit unit according to claim 12, wherein each of said first switching element and said second switching element is constructed of an insulated-gate type field effect transistor.

14. The driver circuit unit according to claim 11, wherein said second circuit comprises:
a third switching element connected between a power supply line and said second output terminal, said third switching element being turned ON and OFF according to said transmitted data;
a third resistor interposed between said third switching element and said second output terminal;
a fourth switching element connected between said second output terminal and the ground, said fourth switching element being turned ON and OFF according to said transmitted data when said third switching element is turned OFF and ON, respectively; and
a fourth resistor interposed between said fourth switching element and said second output terminal.

15. The driver circuit unit according to claim 14, wherein each of said third switching element and said fourth switching element is constructed of an insulated-gate type field effect transistor.

16. The driver circuit unit according to claim 15, wherein said third switching element and said fourth switching element both of which are conductive are smaller in resistance value than said third resistor and said fourth resistor, respectively.

17. The driver circuit unit according to claim 14, wherein said third switching element and said fourth switching element both of which are in conductive state are smaller in resistance value than said third resistor and said fourth resistor, respectively.

18. A driver circuit unit having a first and a second output terminal both connected with a receiver through a first and a second transmission line, respectively, said driver circuit unit comprising:
a first circuit for issuing an output signal to said first output terminal through a first resistor and a second resistor when transmitted data is issued to a first input terminal, said output signal having its logic level correspond to said transmitted data;
a second circuit for issuing a negative-phase output signal to said second output terminal through a third resistor when negative-phase data, which is one reversed in phase of said transmitted data, is issued to a second input terminal, said negative-phase output signal having its logic level correspond to said negative-phase data; and an adjusting resistor connected between said first and said second output terminals wherein said second circuit comprises:

a third switching element connected between a power supply line and said second output terminal, said third switching element being turned ON and OFF according to said transmitted data;

said third resistor interposed between said third switching element and said second output terminal;

a fourth switching element connected between said second output terminal and the ground, said fourth switching element being turned ON and OFF according to said transmitted data when said third switching element is turned OFF and ON, respectively; and a fourth resistor interposed between said fourth switching element and said second output terminal.

19. The driver circuit unit according to claim 18, wherein each of said third switching element and said fourth switching element is constructed of an insulated-gate type field effect transistor.

20. The driver circuit unit according to claim 19, wherein said third switching element and said fourth switching element both of which are in conductive state are smaller in resistance value than said third resistor and said fourth resistor, respectively.

21. The driver circuit unit according to claim 18, wherein each of said third switching element and said fourth switching element is constructed of an insulated-gate type field effect transistor.

22. The driver circuit unit according to claim 21, wherein said third switching element and said fourth switching element both of which are in conductive state are smaller in resistance value than said third resistor and said fourth resistor, respectively.

23. The driver circuit unit according to claim 18, wherein each of said third switching element and said fourth switching element is constructed of an insulated-gate type field effect transistor.

24. The driver circuit unit according to claim 23, wherein said third switching element and said fourth switching element both of which are in conductive state are smaller in resistance value than said third resistor and said fourth resistor, respectively.

25. The driver circuit unit according to claim 18, wherein said third switching element and said fourth switching element both of which are in conductive state are smaller in resistance value than said third resistor and said fourth resistor, respectively.

26. The driver circuit unit according to claim 4, wherein said third switching element and said fourth switching element both of which are in conductive state are smaller in resistance value than said third resistor and said fourth resistor, respectively.

27. The driver circuit unit according to claim 4, wherein said first switching element and said second switching element both of which are in conductive state are smaller in resistance value than said first resistor and said second resistor, respectively.

28. The driver circuit unit according to claim 5, wherein said first switching element and said second switching element both of which are in conductive state are smaller in resistance value than said first resistor and said second resistor, respectively.

* * * * *